April 13, 1937. N. L. ETTEN Re. 20,328

OPERATING MECHANISM FOR PRESSERS

Original Filed March 8, 1932 2 Sheets-Sheet 1

Inventor
Nicholas L. Etten
by Ormig & Hague Attys.

April 13, 1937. N. L. ETTEN Re. 20,328

OPERATING MECHANISM FOR PRESSERS

Original Filed March 8, 1932 2 Sheets-Sheet 2

Inventor
Nicholas L. Etten
by Ormig & Hague Attys.

Reissued Apr. 13, 1937 Re. 20,328

UNITED STATES PATENT OFFICE 20,328

OPERATING MECHANISM FOR PRESSERS

Nicholas L. Etten, Waterloo, Iowa, assignor, by mesne assignments, to Chamberlain Corporation, a corporation of Iowa Original No. 1,947,765, dated February 20, 1934, Serial No. 597,453, March 8, 1932. Application for reissue October 31, 1935, Serial No. 47,668

12 Claims. (Cl. 38—25)

This invention relates to improvements in clothes pressers of that type having a pivoted head and a movable buck designed to be moved toward and from the head, and in that type in which is employed fluid operated means for actuating the buck.

The object of my invention is to provide improved means for locking the head to its supporting frame and in connection therewith means for automatically controlling the fluid pressure in such a manner that the pressure between the buck and the head will always be released only at such times when the head is actually locked in position to prevent injury to the operator.

More specifically it is the object of my invention to provide in a presser of the type above described improved latching mechanism for locking the head in a closed position, said latch being automatically supported in an unlatched position until the head is in a closed position, and in connection therewith manually operated means for moving the latch positively to a closed position, and at the same time operating a valve mechanism for controlling the flow of fluid under pressure to the mechanism for operating the buck.

A further object is to provide in a clothes presser independent fluid operated means for each end of the buck, whereby uniform pressure may be applied to both ends of the buck regardless of any variation in the thickness of the goods being pressed.

A further object is to provide in a clothes presser having a fixed head member and a buck member mounted to move toward and from the head member improved fluid operated means for operating the buck to cause one end of the buck to engage the head member before the other end, and at the same time cause a longitudinal movement of the buck relative to the head as the opposite end of the buck is moved to a closed position to produce an ironing effect between the buck and said head.

My invention consists in the construction, arrangement and combination of the various parts of the device, whereby the objects contemplated are attained, as hereinafter more fully set forth, pointed out in my claims, and illustrated in the accompanying drawings, in which:

Figure 3 is a detail side elevation of the latch mechanism employed in locking the head member to the main frame.

Figure 4 is a detail sectional view taken on the line 4—4 of Figure 3.

Figure 1:
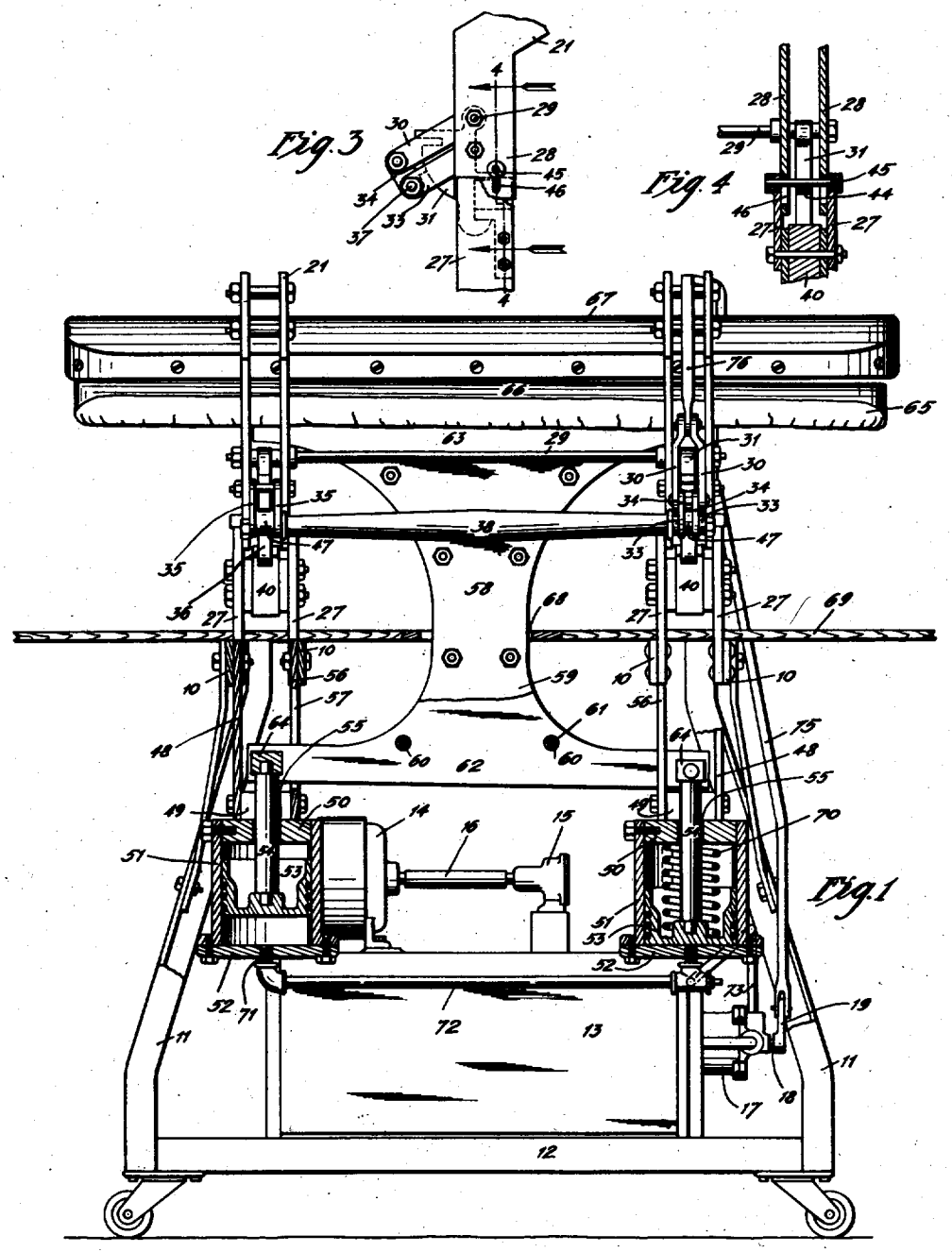
Figure 1 is a front view of my improved presser, the presser cylinders being shown in section.

Referring to the accompanying drawings, I have used the reference numeral 10 to indicate a rectangular frame formed of structural steel supported by leg members 11. The lower ends of the leg members are connected by a frame member 12 on which is supported a fluid supply tank 13 having on its top surface an electric motor 14 to which is operatively connected a fluid pump 15 by means of a coupling 16. Said pump is designed to force air into the tank 13 under pressure, said air being released through a valve chamber 17 secured to one end of the tank 13. Said chamber is designed to support a three way valve of ordinary construction having a stem 18 to which is attached an operating lever 19.

The rear end of the frame 10 is provided with uprights 20 to which the back side of the head frame 21 is pivotally connected by means of bolts 22, said head frame being counterbalanced by means of a spring 23 having one end connected to a rearwardly extending lever 24 of the head frame 21, and its opposite end to an adjusting bolt 25 mounted in a bracket 26 secured to one of the legs 11.

The front side of the frame 10 is provided with upwardly extending portions 27 designed to support the forward end of the head frame 21, said head frame terminating in downwardly extending portions 28 which rest on top of the members 27 when the head frame is in a closed position. Each of the members 28 comprises a pair of spaced bars.

One set of bars 28 is designed to support a rod 29 adapted to support a pair of pivoted bell crank levers 30, said levers being spaced apart and having supported between them a latch device 31, also pivotally mounted on the member 29. Each of the levers 30 has an upwardly extending portion 32. Pivotally secured to one of the members 28 is a link 33 somewhat shorter than the link 30 and substantially parallel therewith. A short link 34 connects the outer end of the links 30 and 33.

The other set of members 28 is provided with a pair of link members 35 similar to the members 33. The pivot 29 extends from one member 28 to the opposite member 28, as illustrated in Figure 1. A latch device 36 is also pivotally mounted on the member 29. A rod 37 connects the free ends of the members 33 and 35, said rod having an enlarged sleeve or handle member 38.

Each of the latches 31 and 36 has a hook portion 39 designed to engage a lug 40 secured to the upright members 27 when the frame 21 is in its latched position. The front edge of the members 31 and 36 is provided with a curved portion 41 and with a notch 42, and with a forwardly extending finger 43. The rear edge of each of the members 31 and 36 is provided with a rearwardly extending lug 44, said lugs being designed to rest beneath a short rod 45 mounted in vertically arranged slots 46 in the members 28 when the hook member 39 is beneath the member 40, and the member 28 rests on the upper end of the corresponding member 27. The rods 45 are in the upper ends of the slots 46 and rest on the upper ends of the members 27.

Supported between each pair of members 33 and 35 is a lug 47 designed to engage the rear portions 41 of the members 31 and 36 when the forward ends of the members 33 are at their lower limit of movement and designed to engage the fingers 43 when the said members 33 are elevated and to cause the hook members 39 to disengage the members 40.

Figure 2:
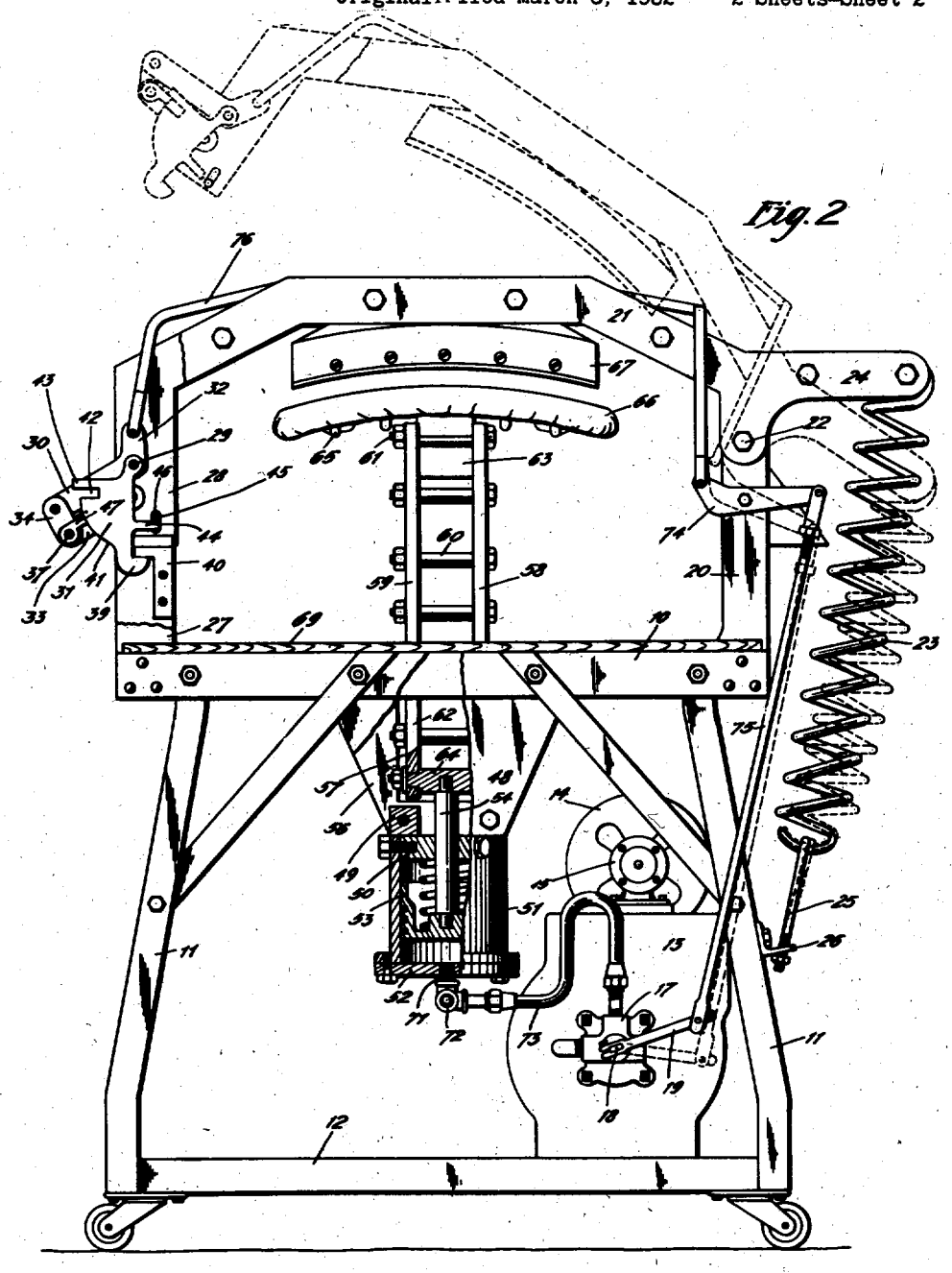
Figure 2 is an end elevation of same, a portion of one of the cylinders being shown in section, and a portion of the head frame being removed to show the construction of the latch mechanism.

As soon as the forward side of the frame 21 is elevated, the rods 45 will move to the lower end of the slots 46, as clearly illustrated by dotted lines in Figure 2, and immediately behind the rear end of the lug 44 in such a manner that the member 39 will be locked to its open position of movement until after the members 28 rest firmly on the top of the members 27. Downward movement of the handle 38, which is manually operated, will cause the free ends of the members 33 and 35 to be lowered, permitting the hook members 39 to move under the members 40 and the lugs 37 to engage the curved portions 41, said curved edges being so arranged that downward movement of the lugs 47 will cause the hook member 39 to be forced under the lugs 40. The hook members 39 are released by simply elevating the handle member 38. The up and down movement of the free ends of the members 33 will cause the levers 30 to be operated and the upper end of the members 32 to be moved forwardly and rearwardly for the purpose of controlling a fluid controlled valve in the manner hereinafter made clear.

Secured to each end of the frame member 10 is a downwardly extending bracket 48 supporting blocks 49. Carried by each of the blocks 49 is a cylinder head 50 to which a fluid cylinder 51 is secured. The lower end of each of the cylinders has a detachable head 52. A piston 53 is mounted in each of the cylinders and provided with a piston rod 54 slidably mounted in openings 55 in the members 49 and 50.

Supported inside of each of the bracket members 48 is a bracket member 56, each having a slot 57. Said slots 57 are designed to slidably receive the lower end of what I shall term a pedestal 58 formed of spaced plates 59 separated by a sleeve 60 mounted on bolts 61, said bolts serving to anchor the two plates together. Said pedestal comprises a base portion 62 and a top portion 63. Said base portion comprises laterally extending ends between which are pivotally mounted bars 64 connected to the upper ends of the connecting rods 54. By this arrangement means is provided whereby the pedestal 58 may be elevated and lowered by elevating and lowering the pistons 53.

Mounted on the top portion of the pedestal is a presser buck 65 provided with the usual padding 66 and designed to engage a head member 67 carried by the frame member 21. The central portion of the pedestal 58 moves through an opening 68 in the table 69. Mounted in one of the cylinders 51 is a spring 70, one end of which engages the piston 53 and the other engages the member 50.

Supported in the head 52 of each of the cylinders 51, I have provided a nipple 71 making connection with a common pipe 72 which in turn is connected to the valve chamber 17 by means of a pipe 73.

Supported on one of the members 20 is a bell crank lever 74 having one end pivotally connected to the upper end of an adjustable link 75, the lower end of said link being pivotally connected to the arm 15 of the valve 18. Pivotally connecting the upper end of the member 32 and the inner end of the lever 74 is a link 76 so arranged that as the free ends of the members 33 and 35 are elevated by means of the handle 38, the upper end of the member 32 may be moved rearwardly, causing the link 76 to move rearwardly and the inner end of the members 74 to move upwardly and rearwardly and the link 75 to move downwardly, causing the valve 18 to be rotated to a position for cutting off liquid from the supply tank under pressure, and for moving said valve to exhaust position whereby fluid will be permitted to flow from the lower ends of the cylinders 51 to said valve where it is exhausted to the atmosphere, thus permitting the buck member 65 to be lowered. Further upward movement of the handle 38 causes the members 47 to engage the fingers 43 and hooks 39 to disengage the lugs 40, after which the frame 21 will be elevated to the dotted line position so that goods to be pressed may be placed on the buck 65, after which the frame 21 is lowered until the rods 45 engage the upper ends of the members 27, causing said rods to move upwardly in the slots 46, then permitting the hook member 39 to swing into operative position beneath the lugs 41.

Downward movement of the handle 38 will then cause the upper end of the member 32 to move forwardly, causing the lever 29 to be elevated to the solid line position in Figure 2, at which time fluid is admitted to the bottoms of the pistons 53.

On account of the spring 70 it will readily be seen that the piston not provided with said spring will be elevated first, causing the corresponding end of the buck 65 to engage the head 67 as further pressure is applied. Then the opposite piston is elevated against the pressure of the spring 70, causing the corresponding end of the buck 65 to also be elevated.

In this connection, it should be observed, however, that inasmuch as the base member 62 and the members 64 are mounted a considerable distance below the head 67 and below the padding 66, that after the first piston to operate has moved to its uper limit of movement, then the pedestal 58 will swing about the pivot center of the member 64 of the corresponding piston, causing the upper end of the buck to move longitudinally of the head 67 as the second piston is operated, thereby providing means whereby a slight ironing effect will take place at the time the pressure is being applied.

Thus it will be seen that I have provided an improved presser having fluid operated means for operating the buck in such a manner that substantially uniform pressure is applied to both ends of the buck, even if the goods being pressed is thicker at one end than the other, as the amount of movement of the pistons 53 is independent and at the same time maintains the same pressure.

Furthermore it will be seen that I have provided an improved lock device whereby it is impossible to apply power to the piston until after the head has been locked in position, and whereby it is impossible to unlatch the head until said power has been removed and the control valve placed in an exhaust position.

What I claim is:

1. In a device of the class described, the combination of a supporting frame, a head frame having one side hinged thereto, a head carried by said head frame, means for locking the free edge of said head frame to the supporting frame, said means including a manually operated latch; a buck, fluid operated means for moving said buck toward said head, the last said means including a control valve, and means actuated by said latch for operating the control valve whereby said valve is opened only after the head frame is locked in a closed position, and whereby said valve is closed before said latch is released.

2. In a device of the class described, the combination of a supporting frame, a head having one side hinged thereto, means for locking the other side of said head to said frame, a buck, a pedestal supporting said buck having a base member extending longitudinally of said buck, fluid operated means supporting each end of said base, means for delivering fluid under pressure to said fluid operated means for elevating said buck, and yieldable means for retarding the upward movement of one end of said base, for the purposes stated.

3. In a device of the class described, the combination of a supporting frame, a head having one side hinged thereto, means for locking the other side of said head to said frame, a buck, a pedestal supporting said buck having a base member extending longitudinally of said buck, fluid operated means supporting each end of said base, means for delivering fluid under pressure to said fluid operated means for elevating said buck, means for controlling said fluid operated means, and means actuated by said locking device for controlling the last said means.

4. In a device of the class described, the combination of a supporting frame, a head having one side hinged thereto, means for locking the other side of said head to said frame, said means including a latch device, manually operated means for actuating said latch device, a buck, fluid operated means for elevating each end of said buck independently, means for delivering fluid under pressure to said fluid operated means for elevating said buck, means actuated by the movement of said latch device operating means for controlling the flow of fluid to and from said fluid operated means, whereby the head will be locked in position before the buck is elevated, and whereby the fluid pressure is released from the buck before said latch device is released.

5. In a device of the class described, a supporting frame, a head carried thereby, a buck adapted to move toward and from said head, means for imparting independent pressure to each end of said buck, and yieldable means for retarding the movement of one end of said buck, for the purposes stated.

6. In a device of the class described, a supporting frame having a pivoted head, means for latching the head in a closed position, a buck mounted to move toward and from said head, means for imparting movement to said head, means for controlling the movement of the last said means, means for operatively connecting the last said means with said latch device whereby latching movement of said latch device will cause the power to be applied to said buck only after the latch has been closed and to be cut off before the latch member is released.

7. In a device of the class described, the combination of a supporting frame, a head having one edge hinged to said frame, manually operated means for latching the free edge of said head to the supporting frame, a buck, power operated means for moving said buck toward said head, means controlled by the latching movement of said latching means for setting into operation said power operated means and only after the head has been locked in position.

8. In a device of the class described, the combination of a supporting frame, a head having one side hinged thereto, means for locking the other side of said head to said frame, a buck, a pedestal supporting said buck having a base member extending longitudinally of said buck, means for simultaneously and independently applying upward pressure to the ends of said base member, and yieldable means for retarding the upward movement of one end of said base member.

9. A press ironing device having in combination a frame, a buck mounted on the frame, a supporting arm pivotally mounted on said frame rearward of said buck, an ironing head mounted on said supporting arm and overlying said buck, means comprising mechanism secured to the supporting arm and within the ready grasp of the operator for moving the ironing head toward and away from the buck and for locking same in operative position over the buck, and manually controlled fluid operated means controlled by said mechanism for moving and locking the head, for forcing the buck against the ironing head when the latter is in its locked position.

10. A press ironing device comprising a frame, a buck mounted on the frame, a supporting arm pivotally mounted on the frame rearward of the buck, an ironing head mounted on said supporting arm in position to overlie said buck, manually accessible means on said arm for moving the latter upon its pivot to move said head toward or away from said buck and for locking the arm in position to hold the head in position overlying said buck, and fluid pressure means controlled by movement of said manually accessible means actuating said buck to press the same against said head.

11. A press ironing device comprising a frame, a buck mounted thereon, a supporting arm pivotally mounted on the frame, an ironing head carried by said arm which is movable upon its pivot to position said head over or away from the buck, manual means on the arm for moving and locking the same with respect to the frame and buck, means for moving the buck into pressure relationship with the head and manual means on said arm controlling said movement.

12. A press ironing device having in combination a frame, a buck mounted on the frame, a supporting arm pivotally mounted on said frame rearward of said buck, an ironing head mounted on said supporting arm and overlying said buck, a handle carried by the supporting arm and within the ready grasp of the operator for moving the ironing head toward and away from the buck, a locking mechanism operated by said handle for locking the head in operative position over the buck, and fluid operated means also controlled by said handle for forcing the buck against the ironing head when the latter is in its locked position with respect to the buck.

NICHOLAS L. ETTEN.